(12) United States Patent
Palomares Rentero

(10) Patent No.: US 9,909,565 B2
(45) Date of Patent: Mar. 6, 2018

(54) WIND TURBINE ROTATIONAL SYSTEM

(71) Applicant: ALSTOM RENEWABLE TECHNOLOGIES, Grenoble (FR)

(72) Inventor: Pedro Palomares Rentero, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 359 days.

(21) Appl. No.: 14/758,791

(22) PCT Filed: Jan. 14, 2014

(86) PCT No.: PCT/EP2014/050585
§ 371 (c)(1),
(2) Date: Jun. 30, 2015

(87) PCT Pub. No.: WO2014/108555
PCT Pub. Date: Jul. 17, 2014

(65) Prior Publication Data
US 2016/0003222 A1  Jan. 7, 2016

Related U.S. Application Data

(60) Provisional application No. 61/785,021, filed on Mar. 14, 2013.

(30) Foreign Application Priority Data

Jan. 14, 2013  (EP) .................................... 13382009

(51) Int. Cl.
*F03D 7/04*  (2006.01)
*F03D 7/02*  (2006.01)
*F03D 1/06*  (2006.01)

(52) U.S. Cl.
CPC .............. *F03D 7/044* (2013.01); *F03D 1/06* (2013.01); *F03D 7/0204* (2013.01);
(Continued)

(58) Field of Classification Search
CPC ........ F03D 7/044; F03D 7/047; F03D 7/0204; F03D 7/0224; F05B 2240/40; F05B 2270/111; Y02E 10/723; G05D 17/02
(Continued)

(56) References Cited

U.S. PATENT DOCUMENTS

| 7,944,070 B2 | 5/2011 | Rosenvard et al. |
| 8,116,914 B2 * | 2/2012 | Oohara ................. F03D 7/0224 290/44 |

(Continued)

FOREIGN PATENT DOCUMENTS

| EP | 24 954 35 | 9/2012 |
| WO | WO 2012/000504 | 1/2012 |

*Primary Examiner* — Woody Lee, Jr.
*Assistant Examiner* — Brian O Peters
(74) *Attorney, Agent, or Firm* — Dority & Manning, P.A.

(57) ABSTRACT

Wind turbine rotational system having several drives and a central control system (CCS), each drive comprising a motor, an electronic converter and an actuator. The CCS sends speed and torque setpoints to the electronic converters which drive the motors according to said setpoints. Operation of the system comprises: designating a drive as master and the other drives as slaves; designating, for each slave, one of the drives as reference drive; the CCS determining master speed and torque setpoints, and sending them to the master; the CCS obtaining real torque of the master; CCS obtaining real speed of each reference drive; and the CCS sending to each slave a slave speed setpoint equal to the master speed setpoint, and a slave torque setpoint equal to (Continued)

the real torque of the master plus a variable offset based on a difference between the master speed setpoint and the real speed of its reference drive.

20 Claims, 2 Drawing Sheets

(52) U.S. Cl.
CPC ........... *F03D 7/0224* (2013.01); *F03D 7/047* (2013.01); *F05B 2240/40* (2013.01); *F05B 2270/111* (2013.01); *Y02E 10/721* (2013.01); *Y02E 10/723* (2013.01)

(58) Field of Classification Search
USPC .......................................... 700/287–290, 304
See application file for complete search history.

(56) References Cited

U.S. PATENT DOCUMENTS

| | | | |
|---|---|---|---|
| 8,805,595 B2* | 8/2014 | Menke | F03D 7/0224 290/44 |
| 2011/0318178 A1 | 12/2011 | Andersen | |
| 2012/0193917 A1* | 8/2012 | Chen | F03D 7/0224 290/44 |
| 2013/0028740 A1* | 1/2013 | Koehnke | F03D 7/0224 416/147 |
| 2014/0017082 A1* | 1/2014 | Palomares Rentero | F03D 7/0224 416/1 |
| 2014/0306458 A1* | 10/2014 | Palomares Rentero | F03D 7/0224 290/55 |

\* cited by examiner

WIND TURBINE ROTATIONAL SYSTEM

This application claims the benefit of European Patent Application 13 382 009.2 filed on Jan. 14, 2013 and U.S. Provisional Patent Application Ser. No. 61/785,021 filed on Mar. 14, 2013.

The present invention relates to a method of operating a wind turbine rotational system having a plurality of drives and a central control system, each drive comprising a motor, an electronic converter for driving the motor and an actuator operatively connected with the motor.

The present invention also relates to a wind turbine rotational system suitable for performing such a method.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft, either directly or through the use of a gearbox, to a generator. This way, the generator produces electricity which is supplied into the electrical grid.

A wind turbine may comprise rotational systems (e.g. yaw systems or pitch systems) having several motors working together to cause rotation of the system. A yaw system is normally used for orienting the rotor of the wind turbine in the prevailing wind direction. Normally, when the rotor is aligned to the wind direction, the yaw system maintains the position of the rotor. When the rotor is misaligned from the wind direction the yaw system rotates the nacelle to reach an appropriate alignment with the wind.

A yaw system normally performs this rotation of the nacelle by means of a plurality of electric motors with suitable gearboxes for driving gears (pinions) meshing with an annular gear. This annular gear may be attached to the nacelle or to the wind turbine tower. The nacelle can thus be rotated around the tower's longitudinal axis in or out of the wind direction.

Pitch systems are employed for adapting the position of a wind turbine blade to varying wind conditions by rotating the blade along its longitudinal axis. Similarly to the yaw systems explained before, a pitch system of a single blade may comprise a plurality of electric motors for driving actuating gears (pinions) which mesh with an annular gear to set the corresponding blade into rotation. To this end, the annular gear may be provided on the blade and the electric motors and actuators may be mounted on the hub. Alternatively, the annular gear may be provided on the hub and the electric motors and actuators may be mounted on the blade.

An aspect of providing a plurality of motors for a wind turbine rotational system is that local wear on the annular gear may be reduced. Furthermore, when a plurality of motors is used, the motors may be less powerful than if a single motor were used. A consequence of this is that the annular gear may be thinner. Another aspect is that redundancy may be also provided, so that even if one or more motors fail, the wind turbine rotational system can still be operated.

Different approaches for driving the plurality of motors are known. For example, some applications use a common single driver (e.g. electronic converter) for driving all the motors in accordance with common setpoints. An advantage of this approach may be that only one driver is required, which makes the control of the motors rather cheap. However, if this single driver fails, the whole rotational system may become inoperative. Moreover, sharing of loads between the motors may be significantly unbalanced (some could be working as motor and others as generator), which may cause some components of the rotational system to suffer stress, fatigue and/or mechanical wear.

Some other applications use multiple drivers/motors working in parallel without synchronization. This approach is based on having several motors and a driver (e.g. electronic converter) for each motor, the motors being driven (each motor by its dedicated driver) in accordance with setpoints common to all the drivers. Since each motor is driven by its dedicated driver, if one of these drivers fails, only its related motor may become inoperative and not the whole system. The application of this approach is simple and uses relatively cheap components, which makes the control of the motors rather cheap. However, sharing of loads between drivers/motors may be significantly unbalanced (some could be working as motor and others as generator), which may cause some components of the rotational system to suffer stress, fatigue and/or mechanical wear.

Another approach is disclosed by the U.S. Pat. No. 7,944,070B2, which describes a yaw system including a plurality of motors, a plurality of controllers, one controller for each of the motors, and a yaw system controller. Each controller is configured to control the respective motor and coupled to at least one other controller to transmit operation information thereto. The yaw system controller is configured to transmit control information to at least one controller of the plurality of controllers. At least one of the controllers is configured to control the respective motor based on at least one of the control information and the received operation information from the at least one other controller. Some aspects of this system, which is based on communication between controllers, may be that a faster response of the yaw system according to a change of wind conditions can be provided, and that a torque applied on the nacelle can be more equally shared among the plurality of motors.

However, functionalities requiring significant processing capabilities are attributed to the controllers. Moreover, since these functionalities are implemented individually by each controller to achieve desired behaviors of the overall system, a good coordination between said functionalities may be required. Therefore, this system may require complex and expensive controllers with complex and expensive implementations of individual functionalities.

SUMMARY OF THE INVENTION

There still exists a need for new wind turbine rotational systems and methods of operating such systems that at least partially resolve some of the above mentioned problems. It is an object of the present invention to fulfill such a need.

In a first aspect, the present invention provides a method of operating a wind turbine rotational system having a plurality of drives and a central control system, each drive comprising a motor, an electronic converter for driving the motor and an actuator operatively connected with the motor. The central control system is adapted to send speed setpoints and torque setpoints to the electronic converters and the electronic converters are adapted to drive the motors in accordance with the received setpoints. Speed setpoints are defined as speed values the rotational system is expected to achieve. Torque setpoints are defined as maximum torque values which cannot be surpassed as they relate to mechanical constraints (torque setpoints are not torque values to track).

The method comprises designating one of the drives as a master drive and designating the other drives as slave drives, and designating, for each of the slave drives, one of the drives as drive of reference. The method also comprises the central control system determining a master speed setpoint and a master torque setpoint, and the central control system sending the master speed setpoint and the master torque setpoint to the master drive. The method also comprises the central control system obtaining, from the master drive, a value representing the real torque of the motor of the master drive, and obtaining, from each drive of reference, a value representing the real speed of the motor of the drive of reference. The method further comprises the central control system sending a slave speed setpoint and a slave torque setpoint to each of the slave drives, said slave speed setpoint being equal to the master speed setpoint, and said slave torque setpoint being equal to the value representing the real torque of the master drive plus a variable offset value based on a difference between the master speed setpoint and the value representing the real speed of its drive of reference.

Each actuator operatively connected with the corresponding motor may be a suitable gearbox for driving a gear (pinion). All these gears (pinions) may mesh with an annular gear, such that rotation of the motors may be transmitted to the annular gear through said gearboxes and gears. This rotation of the annular gear may cause rotation of the rotational system.

Each electronic converter is a device adapted to receive torque and speed setpoints and to power its related motor in accordance with said torque and speed setpoints. Each drive which may be designated as master drive is adapted to obtain a value representing the real torque developed by its related motor, and each drive which may be designated as reference drive is adapted to obtain a value representing the real speed developed by its related motor, such that said real torque and speed may be provided to the central control system for calculations. Hence, taking this into account, as the electronic converters do not typically have powerful processing capabilities, the rotational system may be cheaper in comparison with other systems comprising more complex devices such as e.g. PLCs (Programmable Logic Controllers).

The value representing the real torque of the master drive and the value representing the real speed of the drive of reference may be obtained by estimating or, alternatively, by measuring. Converters having functionalities for estimating the real torque and speed developed by its related motor are known. These converters may act as motor drivers in the context of the present invention. Estimation of the real torque and speed is normally performed by said converters from electric magnitudes powering the motor (e.g. electric currents provided by the converter to the motor) and mechanical features of the motor. Alternatively to estimating real torque and speed, sensors (integrated or not with the converter) for measuring said real torque and speed may be used. On one hand, converters with estimation of torque and speed are cheaper than having dedicated sensors to measure torque and speed. On other hand, said estimation by said converters produces torque and speed values of lower accuracy than the values provided by dedicated sensors. However, said estimation by said converters is considered to be accurate enough in the context of the present invention.

A speed setpoint is defined as a signal to be provided to an electronic converter indicating the speed to be developed by the related motor. A torque setpoint is defined as a signal to be provided to an electronic converter indicating the maximum torque to be developed by the related motor, said maximum torque value being mainly limited by mechanical constraints. Consequently, the real torque value (developed by the motor) will always be lower than said torque setpoint and dependent on operational conditions such as, e.g. wind speed. For particular speed and torque setpoints provided to an electronic converter, the real speed developed by the related motor is expected to be equal to the speed setpoint, while the real torque developed by the motor should be below the torque setpoint. However, the real torque developed by the motor may reach the torque setpoint for certain short periods.

Movement of a multi-motor rotational system in a wind turbine normally comprises detection of when said movement is needed, and generation of corresponding setpoints to cause individual movement of the motors for causing together the desired movement of the whole system. Generation of a setpoint may comprise detecting when the generation of said setpoint is required. In a movement operation, different strategies may be applied comprising generation of diverse setpoints of diverse amounts depending on e.g. the progress of the movement operation, wind conditions, etc. For example, setpoints of high amount may be generated at the beginning of the operation to accelerate the movement, whereas setpoints of low amount may be generated at the end of the operation to stop the movement.

In the proposed method, once necessity of new speed and torque setpoints has been detected, the corresponding master speed and torque setpoints are determined and sent to the master drive. This way, the electronic converter of the master drive starts to drive its related motor in accordance with said master speed and torque setpoints. Furthermore, each slave drive is provided with a slave speed setpoint equal to the master speed setpoint. Also, each slave drive is provided with a continuously updated slave torque setpoint. To this end, a value representing the real torque developed by the motor of the master drive and a value representing the real speed developed by the motor of its drive of reference are continuously obtained. The provided slave torque setpoint is continuously updated with a value equal to the value representing the real torque of the master drive plus a variable offset value based on a difference between the master speed setpoint and the value representing the real speed of its drive of reference.

Detection of when generation of new speed and torque setpoints is needed and determination of the corresponding master speed and torque setpoints may be performed in accordance with conventional methods aimed at this end.

Effects of the proposed method may be described as follows, in terms of a sequence of micro-stages.

In a first stage, the master drive receives (master) speed and torque setpoints different from zero, and each slave drive receives (slave) speed and torque setpoints also different from zero. The slave speed setpoint is always equal to the master speed setpoint (different from zero). The slave torque setpoint has a value equal to the real torque of the master drive (equal to zero at this first stage) plus an offset depending on a difference between the master speed setpoint (different from zero) and the real speed of the corresponding drive of reference. The drive of reference may be, for each slave drive, the master drive or one of the slave drives, so, in any case, the real speed of said drive is zero at this stage. Hence, each slave drive receives, at this stage, a slave torque setpoint different from zero, since said setpoint depends on a difference between the master speed setpoint (different from zero) and the real speed of its drive of reference (equal to zero at this stage).

In a second stage, the motor of the master drive starts to work which means that the real torque of the master drive starts to increase. At this stage, the rotational system is still not moving. However, the slave torque setpoints start to increase as the real torque of the master drive is increasing.

In a third stage, the slave drives receive slave torque setpoints sufficiently high to cause movement of the rotational system. The slave torque setpoints have a small torque delay with respect to the master torque setpoint. All the motors (of the drives) try to reach the same speed setpoint (master and slave speed setpoints are identical). The real speed of each drive of reference is still less than the speed to be achieved (master/slave speed setpoint), so the slave torque setpoints are increasing. As the motors accelerate, the real speed of each drive of reference will go closer to the master/slave speed setpoint, so the torque developed by the motors (of the drives) will tend to stabilize.

The equilibrium between all the motors will be achieved when the real speed of each drive of reference reaches the master/slave speed setpoint. At this moment, the difference between the master/slave speed setpoint and the real speed of each drive of reference will be zero or near zero, so the slave torque setpoints will remain stable.

In some examples of the method, the slave torque setpoint may be equal for all the slave drives.

In some examples, the master drive may also be the drive of reference for all the slave drives.

In some embodiments of the invention, the variable offset value may be determined in accordance with a PID control based on a difference between the master speed setpoint and the value representing the real speed of the drive (when the master drive is also the drive of reference).

An aspect of the embodiments having the master drive as the drive of reference for all the slave drives may be that a simple and cheap configuration may suffice. For example, only the master/reference drive is required to be able of providing real speed and torque developed by its motor.

Alternatively to the embodiments in which the drive of reference is the master drive for all the slave drives, the drive of reference for each slave drive may be the slave drive itself.

In some of these last embodiments, the variable offset value for each slave drive may be determined in accordance with a PID control based on a difference between the master speed setpoint and the value representing the real speed of the slave drive.

A PID control comprises calculating an "error" value as the difference between a measured process variable and a desired setpoint. The PID control attempts to minimize the calculated error value by adjusting the inputs. An aspect of the embodiments using PID control may thus be that adjustment of the variable offset may be progressively improved (by the PID control), which may finally cause an optimal equilibrium between all the drives/motors of the system.

An aspect of the embodiments in which the drive of reference for each slave drive is the slave drive itself may be that slave setpoints may be generated depending on particular conditions of each slave drive. For instance, some slave setpoints may be generated higher than others for causing all the slaves to transmit the substantially same torque to the annular gear. For example, a motor may be less efficient than the others, in which case higher setpoints may be provided to this motor with the goal of transmitting to the annular gear the same torque than the others.

An advantage of the proposed method may be that, since each motor is driven by its dedicated electronic converter, if one of these electronic converters fails, only its related motor may become inoperative and not the whole system.

Another advantage of the method may be that a balanced distribution of the torque to move the system may be achieved by using a simple and cheap system configuration. As the central control unit concentrates most of the logic (intelligence) of the method, and the electronic converters do not typically have powerful processing capabilities, the overall system may be significantly cheap.

A further advantage may be that coordination between all the drives is performed by the central control system, which facilitates the implementation of the method in comparison with distributed implementations. This simplicity of the implementation makes the implementation and its maintenance cheaper. Moreover, if designation of master, slave and reference roles is dynamically performed by the central control system, the life of the motors can be extended in comparison with a predetermined designation or pre-designation.

A still further advantage may be that a quick start of movement operations is provided, since all the drives/motors receive corresponding torque setpoints different from zero at the first stage of the movement operation. See previous example based on micro-stages used to describe effects of the method.

In a second aspect, the invention provides a wind turbine rotational system comprising a plurality of drives and a central control system, each drive comprising a motor, an electronic converter for driving the motor and an actuator operatively connected with the motor, said wind turbine rotational system being adapted to perform any of the methods previously described.

In embodiments of the invention, the wind turbine rotational system may be a pitch system for pitching a blade or, alternatively, the wind turbine rotational system may be a yaw system.

According to some embodiments, a wind turbine is provided comprising a wind turbine rotational system as described before.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1:
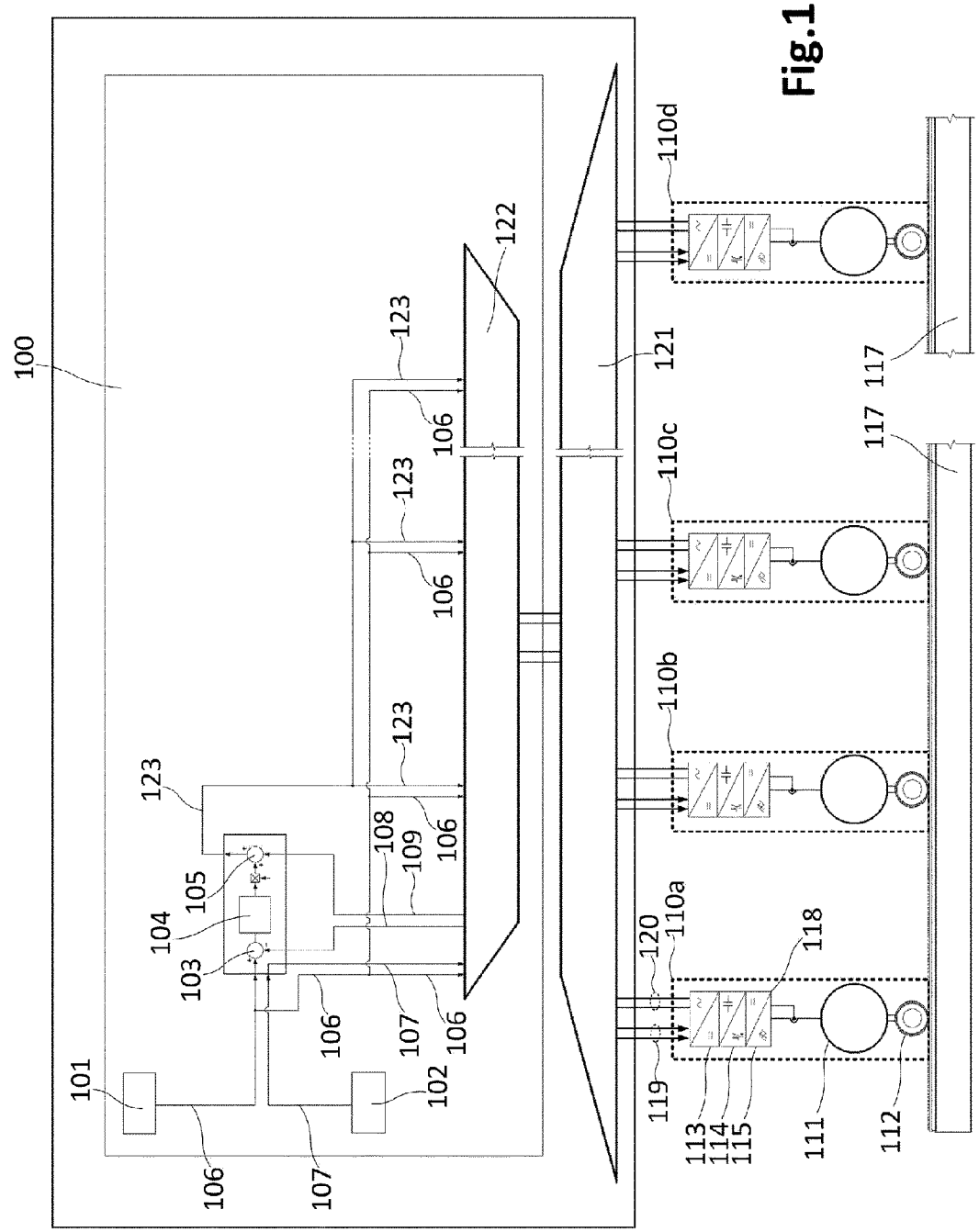
FIG. 1 schematically illustrates a wind turbine rotational system according to a first embodiment of the invention.

FIG. 1 schematically illustrates a wind turbine rotational system comprising a central control system 100, several drives 110a-110d, and an annular gear 117. The rotational system may be a yaw system or a pitch system. This figure shows four drives 110a-110d, but other numbers (greater than one) of drives are also possible, depending on the technical features of the system to be driven. A pitch system may normally require fewer drives than a yaw system.

Each drive 110a-110d comprises a motor 111, a converter 118 (which acts as a driver) for driving the motor 111 and an actuator 112 operatively connected with the motor 111. The actuator 112 may comprise e.g. a gearbox and a pinion, each of the pinions meshing with the annular gear 117. The movement produced by each motor 111 may thus be transmitted to the annular gear 117 through the corresponding gearbox and pinion 112. This configuration has the advantage of dividing the overall load for moving the rotational system into several motors 111, several pinions 112 and several portions of the annular gear 117. This may allow decreasing the load of the related motor 111 and may increase the durability of said pinions 112 and annular gear 117.

The central control system 100 of the rotational system may be integrated in the central control system of the wind turbine. In this case, just one control unit may be used to control the rotational system and to perform a centralized control of the overall wind turbine. Some modules and/or executable instructions of this single unit may be dedicated to control the rotational system whereas some other modules and/or executable instructions may be in charge of performing a centralized control of the wind turbine. For example, this single unit may be a PLC (Programmable Logic Controller) which may be programmed with a first set of executable instructions implementing functionalities for performing a centralized control of the wind turbine, and a second set of executable instructions implementing functionalities for controlling the rotational system. In alternative implementations, the central control system of the rotational system may be a unit separated from the central control system of the wind turbine.

The converters 118 may comprise the necessary elements for converting AC power from a power line (not shown) into DC power, and for finally converting said DC power into variable AC power, in accordance with the characteristics of the corresponding motors 111 and/or the power lines. For example, each converter 118 may comprise a rectifier 113, a DC link 114, and an inverter 115. In case of the power line being a DC power line, only conversion of DC power into variable AC power will be required (DC link 114, and inverter 115). As these kinds of converters 118 are generally well known in the technical field, no further detailed descriptions will be provided. In the particular examples illustrated here, the motors 111 are assumed to be AC motors. The invention however is not limited to this particular choice as other suitable motors may also be used.

Dissociation of torque and speed variables is used in embodiments of the operation method to be performed by the rotational system. Thus, application of either DC or AC or reluctance motors and corresponding equipment, such as e.g. suitable converters, allow dynamic adjustment of torque and speed. In this sense, for example, converters with vector control or DTC (Direct Torque Control) may be used for driving said AC motors.

Some protection systems (not shown) for the converters 118 and motors 111 may be provided. These protection systems may be based on means for interrupting or attenuating the electrical current/voltage, as for example fuses, on-off switches, push switches, and so on. These protection systems may be of particular relevance in situations of e.g. electrical surge, in which case the components of the system may be damaged. The central control system 100 may activate/deactivate these protection systems by sending corresponding on-off signals. As these kinds of elements are generally well known in the technical field, no further detailed description will be provided in this context.

This particular control system 100 is suitable for operating with just a single drive of reference, which may be the master drive or any of the slave drives. For sake of clarity, the following descriptions about FIG. 1 will consider that the master drive and the drive of reference are the same drive for all the slave drives.

FIG. 1 also shows a selector 121 acting as an interface between the control system 100 and the drives 110a-110d. Each drive 110a-110d has connections 120 for the drive 110a-110d sending estimated real torque and/or speed to the control system 100, and connections 119 for the control system 100 sending master/slave torque and speed setpoints to the drives 110a-110d. The control system 100 is shown comprising another selector 122 which, in combination with the selector 121, permits serializing transmissions of signals between the control system 100 and the drives 110a-110d. This way, the number of connections (cables) between the control system 100 and the drives 110a-110d may be reduced. Cables of a rotational system may suffer torsions, which may finally damage the system. Thus, reducing the number of cables may reduce the risk of damages in the system.

The control system 100 may provide suitable control signals to both selectors 121, 122 to achieve said serialization of transmissions between the control system 100 and the drives 110a-110d. These control signals may be provided to the selectors 121, 122 depending on the role (master/reference or slave) attributed to each of the drives 110a-110d. A dynamic designation of master/reference and slave roles to the drives 110a-110d may thus be performed with the configuration illustrated by FIG. 1. Any alternative known configuration permitting such a serialization may also be used in a similar way.

In alternative embodiments, the system may comprise exclusive connections between each drive 110a-110d and the control system 100, in which case no elements for implementing serialization of transmissions would be used. An aspect of having exclusive connections for each of the drives 110a-110d is that a high number of cables may be required between the control system 100 and the drives 110a-110d. Another aspect of having exclusive connections for each of the drives 110a-110d is that the system may be more reliable and faster.

FIG. 1 shows the control system 100 comprising a module 101 for determining master speed setpoints, a module 102 for determining master torque setpoints, and a module 103 for calculating a difference between a master speed setpoint (from the module 101) and an estimated real speed of the master/reference drive. The control system 100 is shown further comprising a module 104 for performing a PID control from the output of the module 103 (difference between master speed setpoint and estimated real speed of the master/reference drive), and a module 105 for aggregating (adding) the output of the module 104 (PID control) and the estimated (or measured) real speed of the master/reference drive (from selector 122).

The control system 100 comprises a connection 106 for the module 101 to provide each determined master speed setpoint to the module 103 and to the selector 122, and a connection 107 for the module 102 to provide each determined master torque setpoint to the selector 122. Suitable control signals provided to the selectors 121 and 122 may cause transmission of the master speed and torque setpoints from the selector 122 to the drive 110a-110d having the role of master/reference drive. Suitable control signals provided to the selectors 121 and 122 may cause transmission of the master speed setpoint (as slave speed setpoint) from the selector 122 to the drives 110a-110d having the role of slave drives.

The selector 121 may receive through the corresponding lines 120 the estimated real speed and torque of the motor of the master/reference drive. Suitable control signals provided to the selector 121 may cause the selector 122 to receive from the selector 121 the estimated real speed and torque of the master/reference drive. The control system 100 comprises a connection 108 between the selector 122 and the module 103, such that suitable control signals provided to the selector 122 may cause the module 103 to receive the estimated real speed of the master/reference drive from the selector 122. The control system 100 also comprises a connection 109 between the selector 122 and the module 105, such that suitable control signals provided to the selector 122 may cause the module 105 to receive the estimated real torque of the master/reference drive from the selector 122.

The control system 100 also comprises a connection 123 between the module 105 and the selector 122 for the module 105 to provide its output (aggregation of real torque of the master/reference drive and output of the PID control) to the selector 122. Suitable control signals provided to the selectors 121 and 122 may cause provision to each drive designated as slave drive of the output of the module 105 as the corresponding slave torque setpoint.

In the context of a movement operation performed by the rotational system of FIG. 1, when generation of new torque and speed setpoints is detected as necessary, the control system 100 may generate the corresponding master torque and speed setpoints through the modules 101 and 102. Then, the control system 100 may send these generated master torque and speed setpoints to the selector 122. Suitable control signals provided to the selectors 121 and 122 may cause provision of said master torque and speed setpoints to the converter 118 of the drive 110a-110d designated as master/reference drive. Suitable control signals provided to the selectors 121 and 122 may cause provision of said master speed setpoint (as slave speed setpoint) to the converter 118 of the drives 110a-110d designated as slave drives.

The control system 100 may also obtain, from the converter 118 of the drive 110a-110d designated as master/reference drive, an estimation of the real torque and speed developed by the motor 111 of the drive 110a-110d designated as master/reference drive. Suitable control signals provided to the selectors 121 and 122 may cause the selector 122 to receive said estimated real torque and speed from the master/reference drive.

The control system 100 may use the module 103 to obtain a difference between the master speed setpoint (from module 101) and the estimated real speed of the master/reference drive (from selector 122). This obtained difference may be used as input for the module 104 to perform a PID control of said difference, and the output of said PID control may be aggregated (through the module 105) to the estimated real torque of the master/reference drive (from selector 122) to obtain a corresponding slave torque setpoint. This obtained slave torque setpoint may be received by the selector 122 through the corresponding connections 123, and suitable control signals provided to the selectors 121 and 122 may cause transmission of said slave torque setpoint from the selector 122 to each drive 110a-110d designated as slave drive.

Figure 2:
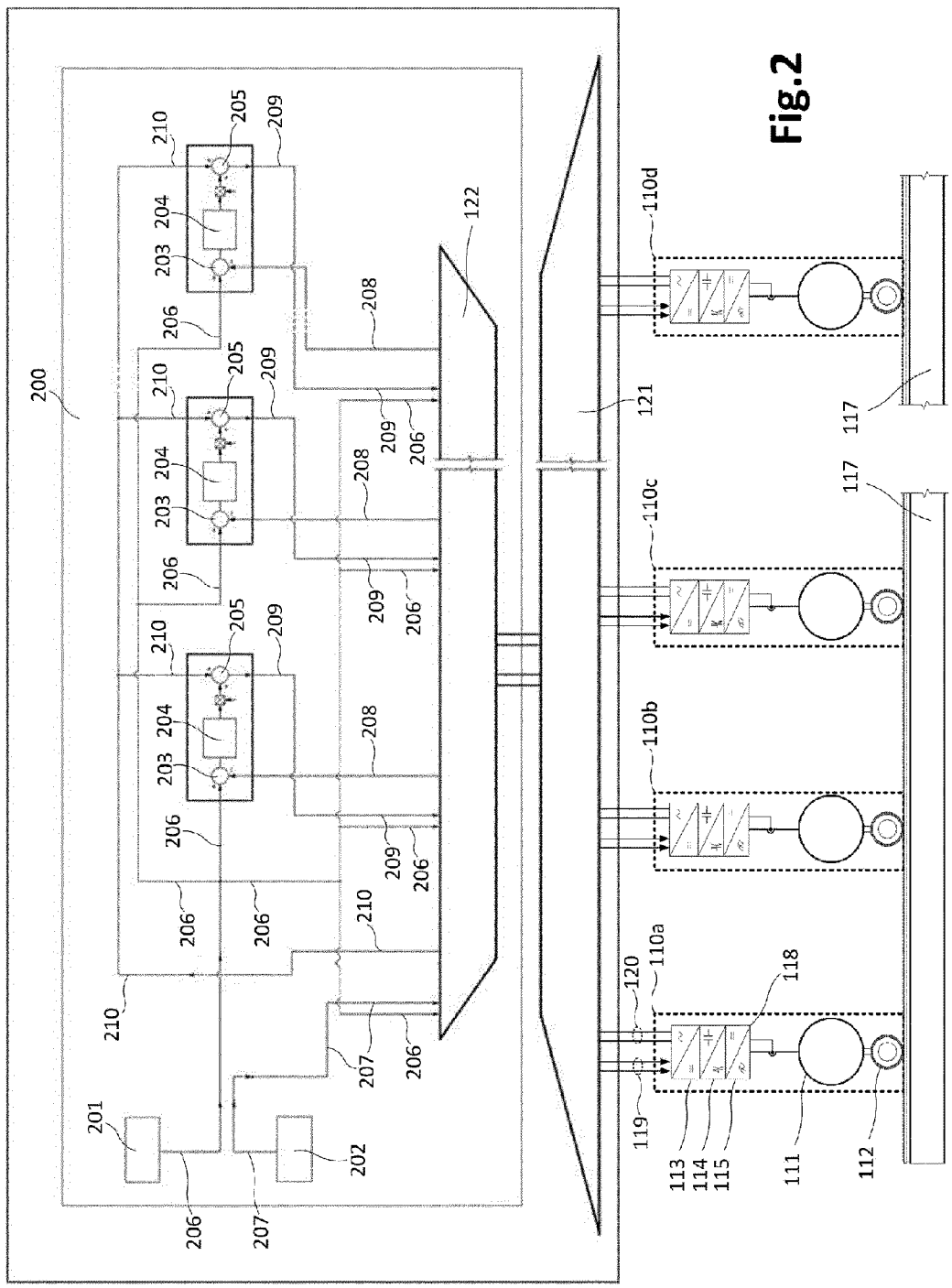
FIG. 2 schematically illustrates a wind turbine rotational system according to a second embodiment of the invention.

FIG. 2 schematically illustrates a wind turbine rotational system according to a second embodiment of the invention. As in the case of the system of FIG. 1, this rotational system also comprises two main parts: drives 110a-110d with a corresponding annular gear 117, and a central control system 200. This rotational system may be a yaw system or a pitch system. This figure shows four drives 110a-110d, but other numbers (greater than one) of drives are also possible, depending on the technical features of the system to be driven. A pitch system may normally require fewer drives than a yaw system.

The drives 110a-110d may be identical or similar to the drives shown for the system of FIG. 1. Connections 119, 120 between the drives 110a-110d and the control system 200 are shown similar with respect to FIG. 1. The control system 200 is shown different from the control system 100 of FIG. 1.

The central control system 200 of the rotational system may be integrated in the central control system of the wind turbine or, alternatively, the central control system 200 of the rotational system may be a unit separated from the central control system of the wind turbine. All the principles commented in this respect with reference to the control system 100 of FIG. 1 are also of application to the system illustrated by FIG. 2.

This particular control system 200 is suitable for operating with several drives of reference. For sake of clarity, the following descriptions about FIG. 2 will consider that the drive of reference of each slave drive is the slave drive itself.

FIG. 2 also shows a selector 121 interfacing the control system 200 and the drives 110a-110d. Each drive 110a-110d has connections 120 for the drive 110a-110d sending estimated real torque and/or speed to the control system 200, and connections 119 for the control system 200 sending master/slave torque and speed setpoints to the drives 110a-110d. The control system 200 is shown comprising another selector 122 which, in combination with the selector 121, permits serializing transmissions of signals between the control system 200 and the drives 110a-110d. This way, the number of connections (cables) between the control system 200 and the drives 110a-110d may be reduced.

The control system 200 may provide suitable control signals to both selectors 121, 122 to achieve said serialization of transmissions between the control system 200 and the drives 110a-110d. These control signals may be provided to the selectors 121, 122 depending on the role (master or slave/reference) attributed to each of the drives 110a-110d. A dynamic designation of master and slave/reference roles to the drives 110a-110d may thus be performed with the configuration illustrated by FIG. 2. Any alternative known configuration permitting such a serialization may also be used in a similar way.

In alternative embodiments, the system may comprise exclusive connections between each drive 110a-110d and the control system 200, in which case no elements for implementing serialization of transmissions would be used.

FIG. 2 shows the control system 200 comprising a module 201 for determining master speed setpoints, and a module 202 for determining master torque setpoints. The control system 200 also comprises, for each slave drive, a module 203 for calculating a difference between a master speed setpoint (from the module 201) and an estimated real speed of the slave/reference drive. The control system 200 is shown further comprising, for each slave drive, a module 204 for performing a PID control from the output of the corresponding module 203 (difference between master speed setpoint and estimated real speed of the slave/reference drive); and, also for each slave drive, a module 205 for aggregating (adding) the output of the corresponding module 204 (PID control) and the estimated real torque of the master drive.

The control system 200 comprises a connection 206 for the module 201 to provide each determined master speed setpoint to each module 203 and to the selector 122, and a connection 207 for the module 202 to provide each determined master torque setpoint to the selector 122. Suitable control signals provided to the selectors 121 and 122 may cause transmission of the master speed and torque setpoints from the selector 122 to the drive 110a-110d having the role of master drive. Suitable control signals provided to the selectors 121 and 122 may cause transmission of the master speed setpoint (as slave speed setpoint) from the selector 122 to the drives 110a-110d having the role of slave drives.

The selector 121 may receive through the corresponding lines 120 the estimated real torque of the motor of the master drive and the estimated real speed of the motor of each slave/reference drive. Suitable control signals provided to the selector 121 may cause the selector 122 to receive from the selector 121 the estimated real torque of the master drive and the estimated real speed of each slave/reference drive. The control system 200 comprises a connection 208 between the selector 122 and each module 203, such that suitable control signals provided to the selector 122 may cause each module 203 to receive the estimated real speed of the corresponding slave/reference drive from the selector 122. The control system 200 also comprises a connection 210 between the selector 122 and each module 205, such that suitable control signals provided to the selector 122 may cause each module 205 to receive the estimated real torque of the master drive from the selector 122.

The control system 200 also comprises a connection 209 between each module 205 and the selector 122 for each module 205 to provide its output (aggregation of real torque of the master drive and output of the PID control) to the selector 122. Suitable control signals provided to the selectors 121 and 122 may cause provision to each drive designated as slave/reference drive of the output of the corresponding module 205 as the corresponding slave torque setpoint.

In the context of a movement operation performed by the rotational system of FIG. 2, when generation of new torque and speed setpoints is detected as necessary, the control system 200 may generate the corresponding master torque and speed setpoints through the modules 201 and 202. Then, the control system 200 may send these generated master torque and speed setpoints to the selector 122. Suitable control signals provided to the selectors 121 and 122 may cause provision of said master torque and speed setpoints to the converter 118 of the drive 110a-110d designated as master drive. Suitable control signals provided to the selectors 121 and 122 may cause provision of said master speed setpoint (as slave speed setpoint) to the converter 118 of the drives 110a-110d designated as slave/reference drives.

The control system 200 may also obtain, from the converter 118 of the drive 110a-110d designated as master drive, an estimation of the real torque developed by the motor 111 of the drive 110a-110d designated as master drive. Suitable control signals provided to the selectors 121 and 122 may cause the selector 122 to receive said estimated real torque from the master drive.

The control system 200 may also obtain, from the converter 118 of each drive 110a-110d designated as slave/reference drive, an estimation of the real speed developed by the motor 111 of said drive 110a-110d designated as slave/reference drive. Suitable control signals provided to the selectors 121 and 122 may cause the selector 122 to receive said estimated real speed from each slave/reference drive.

The control system 200 may use each module 203 to obtain a difference between the master speed setpoint (from module 201) and the corresponding estimated real speed of the slave/reference drive (from selector 122). Each of these obtained differences may be used as input for the corresponding module 204 to perform a PID control of said difference, and the output of each PID control may be aggregated (through the corresponding module 205) to the estimated real torque of the master drive (from selector 122) to obtain corresponding slave torque setpoint. These obtained slave torque setpoints may be received by the selector 122 through the corresponding connections 209, and suitable control signals provided to the selectors 121 and 122 may cause transmission of each slave torque setpoint from the selector 122 to the corresponding drive 110a-110d designated as slave/reference drive.

In the described embodiments, an alternative to estimate torque and speed values may be measuring torque and speed through corresponding sensors arranged to that end.

The described embodiments of the method allow achieving the effect which has been previously described in terms of a sequence of micro-stages. This effect provides equilibrium between all the motors, in which the motors share in a balanced manner the torque moving the overall system. As also argued before, this equilibrium between all the motors may be achieved by operating simple and cheap system configurations (e.g. those illustrated by FIGS. 1 and 2).

In the various embodiments proposed herein, the central control system 100 or 200 has been described in terms of modules and connections for the sake of clarity. In alternative examples, some of the described modules may be integrated in a single module. These modules and connections may be implemented physically. Nevertheless, in alternative implementations, the functionalities performed by said modules and connections may also be implemented logically by e.g. suitably programming a programmable control unit, such as e.g. a PLC (Programmable Logic Controller). A module may be defined as a piece of hardware and/or software implementing one or more functionalities.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind turbine rotational system comprising a plurality of drives and a central control system, each drive comprising: a motor, an electronic converter for driving the motor, and an actuator operatively connected with the motor, wherein
   the central control system sends speed setpoints and torque setpoints to the electronic converters and the electronic converters drive the motors in accordance with the received setpoints,
   the method comprising
   designating one of the drives as a master drive and designating the other drives as slave drives,
   designating a drive of reference, the central control system determining a master speed setpoint and a master torque setpoint, the central control system sending the master speed setpoint and the master torque setpoint to the master drive, the central control system obtaining, from the master drive, a value representing the real torque of the motor of the master drive, the central control system obtaining, from the drive of reference, a value representing the real speed of the motor of the drive of reference, and the central control system sending a slave speed setpoint and a slave torque setpoint to each of the slave drives, wherein the slave speed setpoint is equal to the master speed setpoint, and wherein the slave torque setpoint is equal to the value representing the real torque of the motor of the master drive plus a variable offset value based on a difference between the master speed setpoint and the value representing the real speed of the motor of the drive of reference.

2. The method according to claim 1, wherein the slave torque setpoint is the same for all the slave drives.

3. The method according to claim 2, wherein the master drive is the drive of reference.

4. The method according to claim 3, wherein the variable offset value is determined in accordance with a PID control based on a difference between the master speed setpoint and the value representing the real speed of the motor of the drive of reference, which is the master drive.

5. The method according to claim 1, wherein the drive of reference is one of the slave drives.

6. The method according to claim 5, wherein the variable offset value for each slave drive is determined in accordance with a PID control based on a difference between the master speed setpoint and the value representing the real speed of the motor of the drive of reference, which is the slave drive itself.

7. A wind turbine rotational system comprising a plurality of drives and a central control system, each drive comprising: a motor, an electronic converter for driving the motor, and an actuator operatively connected with the motor, wherein the wind turbine rotational system is adapted to perform the method of claim 1.

8. The wind turbine rotational system according to claim 7, wherein the wind turbine rotational system is a pitch system for pitching a blade.

9. The wind turbine rotational system according to claim 7, wherein the wind turbine rotational system is a yaw system.

10. A wind turbine comprising a wind turbine rotational system according to claim 7.

11. A wind turbine rotational system comprising a plurality of drives and a central control system, each drive comprising: a motor, an electronic converter for driving the motor, and an actuator operatively connected with the motor, wherein the wind turbine rotational system is adapted to perform the method of claim 2.

12. A wind turbine rotational system comprising a plurality of drives and a central control system, each drive comprising: a motor, an electronic converter for driving the motor, and an actuator operatively connected with the motor, wherein the wind turbine rotational system is adapted to perform the method of claim 3.

13. A wind turbine rotational system comprising a plurality of drives and a central control system, each drive comprising: a motor, an electronic converter for driving the motor, and an actuator operatively connected with the motor, wherein the wind turbine rotational system is adapted to perform the method of claim 4.

14. A wind turbine rotational system comprising a plurality of drives and a central control system, each drive comprising: a motor, an electronic converter for driving the motor, and an actuator operatively connected with the motor, wherein the wind turbine rotational system is adapted to perform the method of claim 5.

15. A wind turbine rotational system comprising a plurality of drives and a central control system, each drive comprising: a motor, an electronic converter for driving the motor, and an actuator operatively connected with the motor, wherein the wind turbine rotational system is adapted to perform the method of claim 6.

16. A wind turbine comprising a wind turbine rotational system according to claim 11.

17. A wind turbine comprising a wind turbine rotational system according to claim 12.

18. A wind turbine comprising a wind turbine rotational system according to claim 13.

19. A wind turbine comprising a wind turbine rotational system according to claim 14.

20. A wind turbine comprising a wind turbine rotational system according to claim 15.

* * * * *